United States Patent
Ruckdeschel et al.

(10) Patent No.: US 6,196,583 B1
(45) Date of Patent: Mar. 6, 2001

(54) GAS GENERATOR WITH COOLING DEVICE

(75) Inventors: Rolf Ruckdeschel, Schwangau; Anh-Dung Tieu, Höhenkirchen; Markus Lindner, Birkenfeld; Horst Laucht, Bruckmühl; Marc Winterhalder, Garching/Alz; Martin Fink, Unterbernbach; Christof Hinterberger, Ettlingen; Markus Leifheit, Biberach/Affaltern, all of (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 09/445,899

(22) PCT Filed: Jun. 19, 1998

(86) PCT No.: PCT/EP98/03759

§ 371 Date: Dec. 15, 1999

§ 102(e) Date: Dec. 15, 1999

(87) PCT Pub. No.: WO98/58824

PCT Pub. Date: Dec. 30, 1998

(30) Foreign Application Priority Data

Jun. 20, 1997 (DE) .............................. 197 26 296

(51) Int. Cl.[7] .................................. B60R 21/26
(52) U.S. Cl. .......................... 280/736; 280/741
(58) Field of Search .................... 280/736, 741, 280/742

(56) References Cited

U.S. PATENT DOCUMENTS

| 3,692,495 |   | 9/1972  | Schneiter et al. . |         |
|-----------|---|---------|--------------------|---------|
| 3,810,655 |   | 5/1974  | Pracher .          |         |
| 3,813,007 |   | 5/1974  | Boin et al. .      |         |
| 5,487,561 |   | 1/1996  | Mandzy et al. .    |         |
| 5,829,784 | * | 11/1998 | Brown et al.       | 280/741 |
| 5,851,030 | * | 12/1998 | Johnson et al.     | 280/741 |
| 5,907,120 | * | 5/1999  | Mooney et al.      | 280/741 |
| 5,938,235 | * | 8/1999  | Butt               | 280/711 |

* cited by examiner

*Primary Examiner*—Kenneth R. Rice
(74) *Attorney, Agent, or Firm*—Tarolli, Sundheim, Covell, Tummino & Szabo L.L.P.

(57) ABSTRACT

The present invention relates to an inflator for a safety device, in particular for a vehicle occupant restraint system, comprising a housing (1, 15; 22, 23), a combustion chamber formed in the housing and including a solid propellant (6) for generating hot gas, and a coolant (13) introduced into a predetermined flow path of the hot gas. The inflator in accordance with the invention is characterized in that the flow path of the hot gas passes through a nozzle (10) comprising a pitot zone (20) in which the hot gas emerging from the combustion chamber (21) has a high static pressure, and comprising a nozzle neck (19) in which the hot gas builds up a high dynamic pressure, and in that the coolant (13) is arranged in a sleeve-shaped reservoir (11) extending from the pitot zone (20) at least in part into the nozzle neck (19). The inflator in accordance with the invention permits an effective reduction in the exhaust gas temperature of the generated hot gas.

16 Claims, 2 Drawing Sheets

GAS GENERATOR WITH COOLING DEVICE

The invention relates to an inflator for a safety device, in particular for a vehicle occupant restraint system, comprising a housing, a combustion chamber formed in the housing and including a solid propellant for generating hot gas, and a coolant introduced into a predetermined flow path of the hot gas.

Conventional pyrotechnical inflators contain a propellant charge introduced into a combustion chamber, which, after an electric pulse has been triggered by a sensor due to a crash, is ignited by means of an ignition unit integrated in the inflator. The propellant charge is usually a solid propellant on the basis of sodium azide ($NaN_3$) and an oxidant such as for example $KNO_3$. Due to the toxicity of the sodium azide, sodium azide-free propellants are finding more recent application. However, to maintain the permissible maximum concentrations of the resulting undesirable side products of combustion, these sodium azide-free propellants often feature a higher combustion temperature than that of conventional propellants on a sodium azide basis. This is why attempts are made, in employing sodium azide-free propellants, to cool the hot gas generated on ignition of the inflator by a pyrotechnical igniter using filter units or other means prior to the hot gas entering the gas bag.

U.S. Pat. No. 5,487,561 describes a liquid gas generator in which a liquid coolant of calcium chloride dissolved in water is held in a chamber annularly surrounding the combustion chamber containing the liquid gas. Following ignition of the inflator the released hot gas flows through the liquid coolant chamber and vaporizes the liquid coolant at least in part, as a result of which thermal energy is drawn from the flow of hot gas.

Published German patent application DE-OS 22 29 039 describes an inflator having a combustion chamber and downstream thereof a cooling chamber containing a vaporable coolant such as e.g. a halocarbon. The hot gases generated in the combustion chamber first pass through a filter unit or reaction chamber and then through a nozzle plate separating the reaction chamber from the coolant chamber. The hot gases entering the coolant chamber through the nozzle cause the coolant to be swirled and evaporated, and thus the hot gas flow to be cooled.

Finally, the not pre-published German patent application DE 196 02 695 discloses an inflator in which a fluid-tight liquid coolant container is arranged in a flow space outside of the combustion chamber. The hot gas emerging from the combustion chamber burns through the casing of the container and strikes an expanded silicone rubber saturated with liquid coolant. Due to the evaporation of the liquid coolant the hot gas is further cooled.

All of the documents cited above describe differing arrangements and means of storing the coolant. However, adequate cooling of the hot gases generated by the inflator is only possible when a precisely defined distribution of the droplets of the coolant is assured. Where porous or capillary substrate materials are employed in the systems mentioned above, no such homogenous distribution of the coolant for generating surface areas having a high specific volume can be achieved since due to the high hot gas velocities involved, the frictional resistance occurring in the capillaries and the kinematic viscosity of the coolant employed is too large to set the coolant free from the substrate material in the short time available. Instead, the coolant is pushed out of the capillaries by the hot gas without atomization of the liquid being attained.

Providing greater liquid volumes for cooling the hot gases directly upstream of the exit ports of the inflator may easily result in the exit ports becoming totally clogged, thus fractionating the inflator since the inertia of the coolant employed as well as its viscosity and surface tension do not permit accelerating the droplets of coolant to the hot gas velocity. In this case an ever-increasing pressure materializes in the combustion chamber, and the burning rate of the propellant is further increased due to the high pressure, resulting in the overall system quickly assuming an unstable burning state which may lead to total disintegration of the inflator. A further drawback of the systems known from the cited prior art is the use of a storage medium for liquid coolants which is large in volume as compared to the system as a whole, this resulting in an undesirable mass increase of the inflator.

To avoid these drawbacks the present invention provides an inflator of the aforementioned kind which is characterized in that the flow path of the hot gas passes through a nozzle contour comprising a pitot zone in which the hot gas emerging from the combustion chamber has a high static pressure, and comprising a nozzle neck in which the hot gas builds up a high dynamic pressure, the coolant being arranged in a sleeve-shaped reservoir extending from the region of the pitot zone at least in part into the nozzle neck.

In this arrangement the reservoir for the coolant is preferably provided in the region of the pitot zone of the nozzle contour with radial pressure-relief ports. Furthermore, the sleeve-shaped reservoir may be provided in the region of the nozzle neck with one or more openings. These openings are preferably located on the end face of the reservoir and are set back relative to the downstream end of the nozzle neck, as a result of which in the upper end of the nozzle neck a mixing zone for the hot gas and the coolant is formed. Preferably, the coolant is enclosed in the reservoir in a burstable casing, which may be made, for example, of aluminum or a plastics material.

In a preferred embodiment the housing of the inflator in accordance with the invention is configured tubular and consists essentially of an upper housing part and a lower housing part. In this arrangement, the nozzle contour is arranged in the upper housing part and coaxially to the combustion chamber formed in the lower housing part, the wall of the upper housing part preferably locating the nozzle contour centered. In this embodiment the combustion chamber is preferably separated from the nozzle contour by a perforated plate having bore holes for the exit of the hot gas towards the nozzle. The sleeve-shaped reservoir for the coolant may be centrally secured to the perforated plate and be arranged coaxially to the nozzle contour.

In a further embodiment of the invention the inflator housing consists of a pot-shaped lower housing part and a cover-like upper housing part. In the middle of the upper housing part a sleeve including an igniter is arranged which in the region of the igniter is filled with a pyrotechnical booster charge. The reservoir for the coolant is located on the side of the sleeve opposite the igniter and is separated from the pyrotechnical booster charge by a pressure plate. In this embodiment the combustion chamber preferably annularly surrounds the sleeve containing the coolant and the pyrotechnical booster charge. The nozzle contour is located in the middle of a nozzle plate press-mounted in the lower housing part, the sleeve protruding at least in part into the nozzle contour.

In all of the embodiments of the invention described the solid propellant may be present in the form of pills, pellets, rings or compacts or may have any other form known in the art.

The coolant employed is preferably a fluid having a freezing point of below $-35°$ C. to ensure proper functioning of the inflator even under winter conditions.

The present invention comprises a thermally improved inflator whereby the hot gases resulting from ignition of the igniter and combustion of the propellant are cooled by a coolant contained in the inflator. In so doing, the coolant is vaporized, which in turn contributes towards a desired increase in volume of the flow of hot gas. Due to the extremely rapid combustion process the coolant employed also needs to be vaporized in this short time to achieve a further increase in volume and thus an enhanced performance, at the same time having cooler exhaust gases. To achieve a high heat transmission rate it is necessary to provide a surface area of the coolant which as regards the volume is as large as possible. This can only be achieved by effective atomization. In the present invention the coolant contained in a reservoir is subjected, on the one hand, to pressure materializing from the high combustion chamber pressure resulting from combustion of the solid propellant to be thus forced out of the reservoir and, on the other hand, is sucked out of the reservoir due to the difference in pressure materializing from expansion processes. The coolant is preferably surrounded in the reservoir by a fluid-tight casing, this casing bursting due to the resulting high combustion chamber pressure when the inflator is activated, releasing the coolant for subsequent atomization. The subsequent atomization and mixing action is very quickly terminated, the shear forces resulting in the nozzle contour due to the defined guidance of the gas flow ensuring a high degree of effective mixing and atomization.

The inflator of the kind forming the basis of the invention represents an improvement over prior art since the present invention results in a more favorable energy balance than systems employed hitherto. Due to the hot gases resulting from ignition of the inflator being cooled by a cooling fluid the following additional advantages are achieved:

a) All components located downstream of cooling the hot gases experience less thermal stress, as a result of which thinner wall thicknesses, the employment of other materials, lightweight structures and inflator designs which are more cost-effective and have a smaller geometry are made possible.

b) Slags and salt particles materializing from combustion of the solid propellants can be separated out by cooling the hot gases and held back by suitable filter means in the interior of the inflator, as a result of which the air-bag and module materials are stressed less. In addition to this, reduced particle emission satisfies an important customer requirement.

c) Cooler inflator exit gases make it simpler to adapt the inflator performance since a smaller difference in temperature relative to cold components such as module and air-bag results in a more homogenous distribution of the output of individual inflator charges. Since gas volumes greatly depend on temperature, large differences in temperature within the gas flow often result in greater spreads in the inflator output for like inflator configurations.

d) The system of cooling the hot gases by a cooling fluid forming the basis of the invention has a major effect on the energy balance of the "inflator" system as a whole. Due to the heat input from the hot gas into the cooling fluid, the hot gas is cooled and simultaneously the cooling fluid is vaporized, the vapor generated providing an additional inflating volume for the air-bag disposed downstream. The heat stemming from the hot gas is not made use in the present invention to heat metal knitting filter material, but to generate additional volume due to the evaporation action, as a result of which the output of the inflator is increased as a whole.

e) Since the hot gases are cooled, use can now be made of propellants which hitherto found no application due to excessively high combustion temperatures.

f) As a result of the high increase in volume of cooling fluids during the transition from the liquid phase to the gaseous phase a smaller structure can be selected for the same inflator output which in turn results in further cost savings in the production of inflators. On top of this the trend is now returning to more sporty and smaller steering wheels in which no air-bag systems could hitherto be integrated due to their size. Smaller, more compact inflator designs made possible by the invention now make such sports steering wheels feasible.

g) Employing aqueous cooling fluids produces steam during evaporation which is ecologically no problem. On top of this an additional steam fraction reduces the residual concentrations of ecologically problematic substances in the hot gas.

h) Due to the cooler gas mass resulting from the invention the useful life of the gas bag during the inflation action is longer, i.e. once inflated the gas bag no longer loses its built-up maximum volume after a very short time.

Furthermore, the use of hazardous and thus problematic pyrotechnical systems can be further reduced by the invention. In addition to this, the cooling fluids now being used and planned for future use are available at low cost and in large quantities.

Further features and advantages of the invention will be appreciated from the description of preferred embodiments and the drawings to which reference is made and in which.

Figure 1:
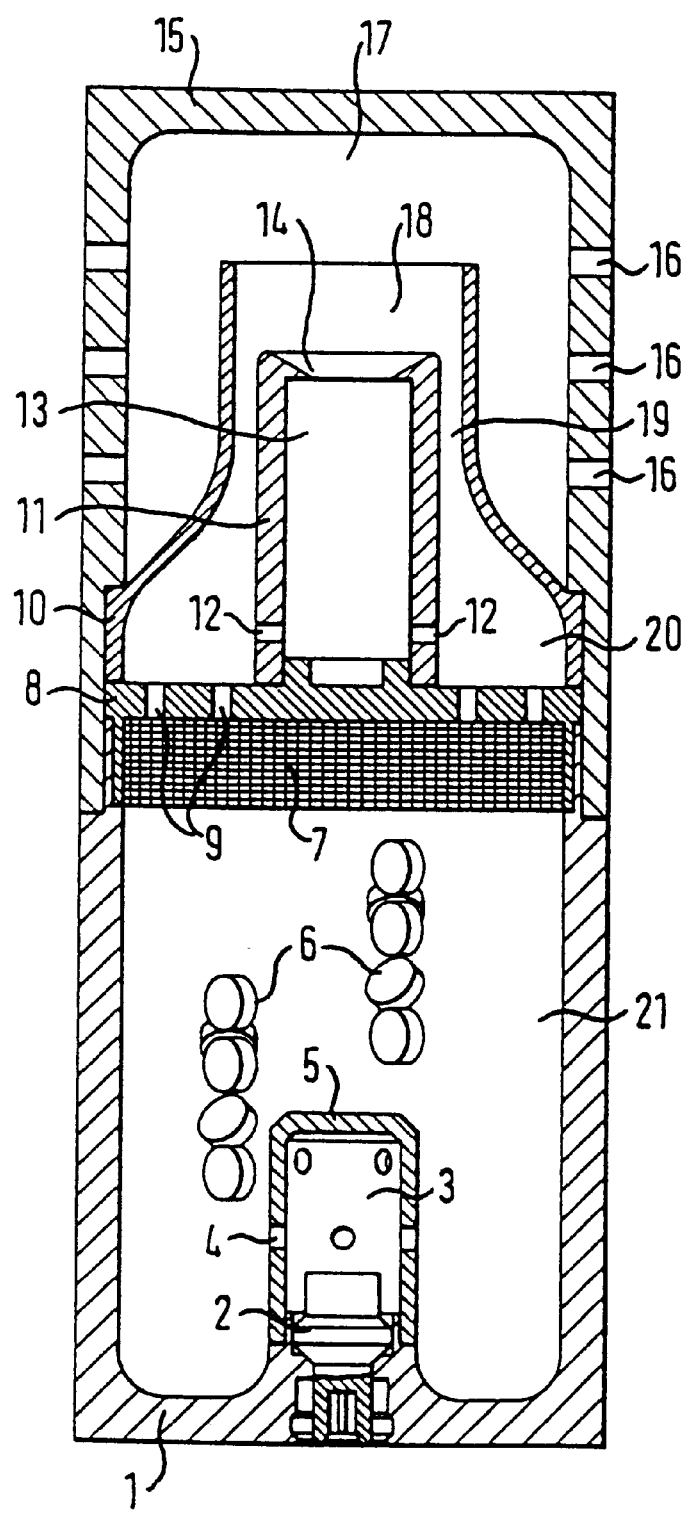
FIG. 1 is a section drawing of a first embodiment in accordance with the invention representing a tubular inflator for use in front passenger, side, thorax or knee air-bag systems.

In a preferred first embodiment (FIG. 1) of the present invention provided for use in front passenger, head, thorax or knee air-bag systems there is located in a tubular lower housing part 1 an igniter 2 with a downstream sleeve 5 filled with a pyrotechnical booster charge 3. Machined in the sleeve 5 are drilled exit ports 4 which are hermetically sealed from within or without by a sealing material (not shown in FIG. 1).

The sleeve 5 protrudes into a combustion chamber 21 formed in the lower housing part 1 and filled with a solid propellant 6 in the form of pellets. Arranged at the end of the lower housing part 1 opposing the igniter 2 is a perforated plate 8 which closes off the combustion chamber 21. A filter 7 disposed in the combustion chamber 21 upstream of the perforated plate 8 is located in place by the latter. Machined in the perforated plate 8 are bore holes 9 through which the hot gas generated by the solid propellant 6 is able to exit towards a nozzle 10.

The nozzle 10 is centered and located by the wall of a tubular upper housing part 15 fixedly connected to the lower housing part 1. The nozzle 10 comprises a pitot zone 20 as well as a nozzle neck 19 which is tapered relative to the pitot zone 20. In the region of the pitot zone 20 the hot gases entering the nozzle 10 develop a high static pressure whilst in the region of the nozzle neck 19 they produce, due to the acceleration effects, a pressure which is lower statically but higher dynamically.

Secured to the center of the perforated plate 8 is a sleeve 11 termed reservoir in the following which is arranged coaxially to the nozzle 10 and extends from the pitot zone 20 partially into the region of the nozzle neck 19. In the region of the pitot zone 20 the reservoir 11 is provided with radial pressure-relief ports 12 permitting pressurization of the cooling fluid 13 contained in the reservoir. The cooling fluid 13 is arranged in the reservoir 11 preferably within an easily burstable envelope (not shown in this case). The reservoir 11 comprises in addition at its end face an opening 14 through which the fluid 13 is able to enter the nozzle neck 19. The end face of the reservoir 11 is set back relative to the free end of the nozzle neck and thus forms in the nozzle neck 19 a mixing zone 18. Provided furthermore in the upper housing part 15 are radial exit ports 16 through which the mixture of hot gas and coolant vapor is able to enter into an air-bag connected to the inflator, via a collecting space adjoining the nozzle neck 19.

The functioning of the inflator in accordance with the invention will now be described in more detail in the following:

When the vehicle is involved in a collision an electronic control system activates the igniter 2 by applying an ignition voltage to the contacts of the igniter in the inflator. The igniter generates hot gases and particles and ignites the downstream booster charge 3 which then furnishes sufficient energy to open the seal in the sleeve 5 by pressure. During combustion the booster charge generates hot gases and hot particles which are then able to enter the lower housing part 1 via the exit ports 4. The pyrotechnical propellant 6 incorporated in the lower housing part 1 commences burning due to the hot gases and hot particles striking the propellant, the booster charge simultaneously pressurizing the propellant 6, as a result of which the propellant 6 burns up very quickly, forming within minimum time a large amount of hot gas which flows through the filter 7 where it is cleaned of slags and dirt. The hot gas is subsequently directed through the ports provided in the perforated plate 8 towards the nozzle 10.

In the pitot zone 20 of the nozzle 10 upstream of the nozzle neck 19 the hot gas chokes, generating a high static pressure, this static pressure being sufficient to open the seal (not shown in FIG. 1) at the pressure-relief ports of the coolant reservoir 11 and to pressurize the latter. The hot gas generated by combustion of the propellant then flows through the nozzle neck 19, it thereby being very strongly accelerated and forming a high dynamic, but low static pressure.

Pressurization of the coolant reservoir 11 causes the easily burstable envelope accommodated therein, filled with a cooling fluid 13, to burst and forces the cooling fluid 13 through the opening 14 in the coolant reservoir 11 into the atomization and mixing zone. The hot gases accelerated by the nozzle contour have in the nozzle neck 19 a high dynamic, but low static pressure as a result of which a difference in pressure is built up in the hot gas between the nozzle pitot zone 20 upstream of the nozzle neck 19 and the atomization and mixing zone 18. This difference in pressure causes additional cooling fluid 13 to be sucked from the coolant reservoir. Since the cooling fluid 13, due to the high dynamic viscosity and higher flow resistance of a fluid as compared to a gas, exhibits a higher flow resistance, high shear forces materialize at the boundary surface between hot gas and cooling fluid 13 due to the high difference in velocity. These shear forces atomize the emerging cooling fluid 13 and simultaneously ensure excellent intermingling of the two media. Due to atomization of the cooling fluid a very large surface area relative to the volume materializes in the cooling fluid 13 which promotes a rapid heat transmission due to the accentuated heat sink as a result of the large difference in temperature between cooling fluid 13 and hot gas, thus resulting in the cooling fluid 13 instantly vaporizing. The shear forces generated by the coaxial arrangement of the nozzle 10 to the coolant reservoir 11 subsequently ensure optimum intermingling of the generated vapor with the hot gas, the recessed arrangement of the coolant reservoir 11 within the nozzle 10 promoting intermingling since this results in a larger atomization and mixing volume 18 being formed.

The resulting mixture of hot gas and vapor flows into the collecting space 17 of the inflator upper housing part 15 and is able to exit outwards to inflate the downstream air-bag through the exit ports 16 machined in the upper housing part 15 of the inflator.

The filter 7, perforated plate 8 and nozzle 10 are preferably centered and located by the upper housing part 15 and lower housing part 1 since it is in the region of the nozzle, due to the flow and high forces in this area, that the loads on the components 8, 10 and 11 are heavy. Thus, the coolant reservoir 11 needs to be likewise connected centered and located to the perforated plate 8 to prevent the coolant reservoir 11 from being shifted forwards in the direction of the collecting space 17 due to the high reaction forces.

The first embodiment of the present invention as described represents but one possibility of arranging the components cited. Just as feasible are further embodiments which contribute towards improving the described functioning of the inflator. Accordingly, it is, for example, feasible to amplify the pressure-relief ports 12 by one or more face end pressure-relief port(s) on the side of the perforated plate to also exploit the dynamic pressure of the hot gas generated by the combustion of the propellant 6 to force the cooling fluid 13 out of the coolant reservoir 11 quicker.

Figure 2:
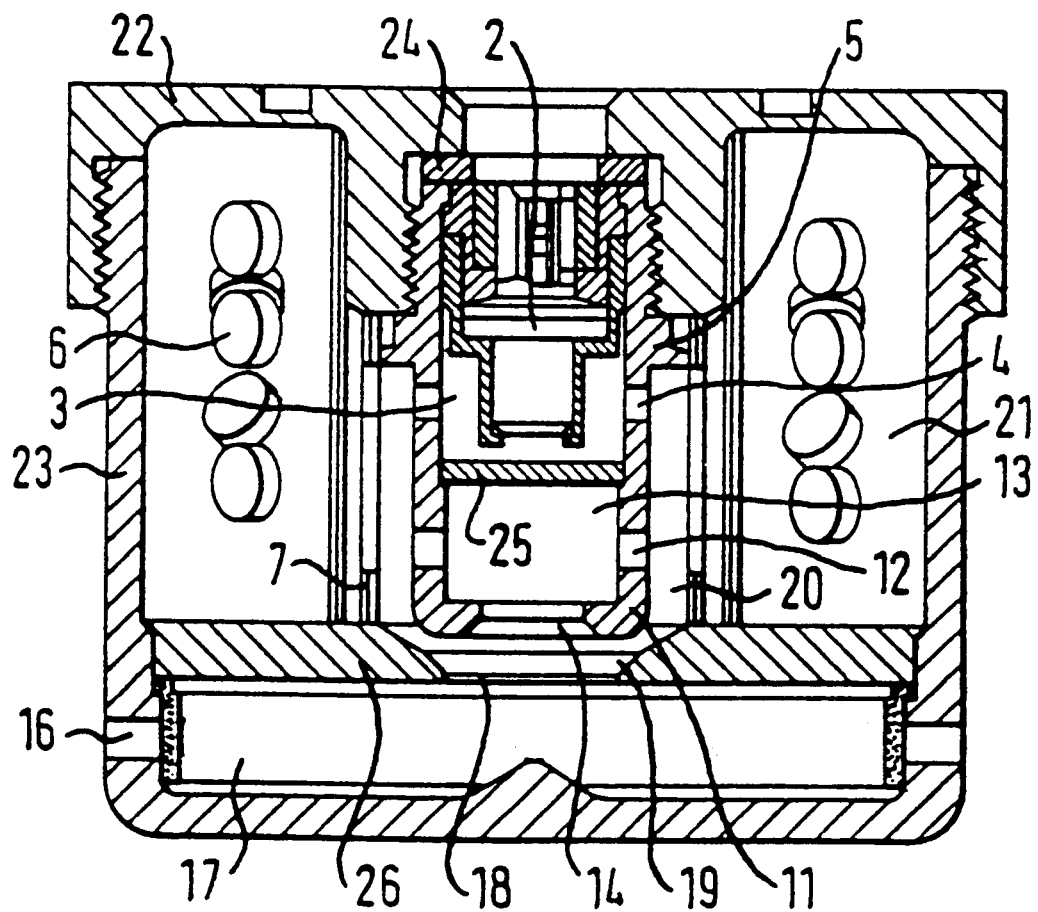
FIG. 2 is a section drawing of a second embodiment in accordance with the invention representing a cylindrical inflator for use in driver air-bag systems.

In a preferred second embodiment (FIG. 2) of the present invention intended for use in air-bag systems on the driver's side an igniter 2 with a sleeve 5 downstream thereof is provided in a cover-like upper housing part 22, the sleeve 5 being filled with a pyrotechnical booster charge 3 in a section adjoining the igniter 2. Machined in the sleeve 5 in the region of the booster charge are exit ports 4 hermetically sealed from the inside or outside by a sealing material (not shown in FIG. 2). The section of the sleeve 5 remote from the igniter forms a coolant reservoir 11 which is encapsulated pressure-tight relative to the booster charge 3 by a pressure plate 25.

Fixedly secured to the cover-like upper housing part 22 is a pot-shaped lower housing part 23. Press-mounted in the lower third of the lower housing part is a plate 26, in the middle of which a nozzle 10 is incorporated. This nozzle 10 is located opposite the coolant reservoir 11, the latter protruding partly into the nozzle.

In the upper portion of the lower housing part a combustion chamber 21 including a solid propellant 6 is formed, the combustion chamber coaxially surrounding the sleeve 5 and the reservoir 11. Assigned to the combustion chamber 21 are filters 7 which are fixedly located by steps formed centrally on the upper housing part 22 and on the nozzle plate 26.

In the embodiment illustrated in this case the sleeve 5 and the coolant reservoir 11 are configured integrally. In the region of the pitot zone of the nozzle contour 10 the reservoir 11 is provided with pressure-relief ports 12. The portion of the reservoir protruding into the nozzle neck 19 of the nozzle contour 10 is provided at the end face with an opening 14. In this arrangement, the opening is arranged so as to be set back relative to the free end of the nozzle neck 19, as a result of which a mixing zone 18 materializes.

In the lower portion of the lower housing part 23, adjoining the plate 26, a collecting space 17 is formed in the region of which the lower housing part 23 is provided with radial exit ports 16.

When the vehicle is involved in a collision an electronic control system activates the igniter 2 by applying an ignition voltage to the contacts of the igniter in the inflator. The igniter generates hot gases and particles and ignites the downstream booster charge 3 which then furnishes sufficient energy to open the seal in the sleeve 5 by pressure. During combustion the booster charge generates hot gases and hot particles which are then able to flow into the lower housing part 23 via the exit ports 4. The pyrotechnical propellant 6 incorporated in the lower housing part 23 commences burning due to the hot gases and hot particles striking the propellant, the booster charge 3 simultaneously pressurizing the propellant 6, as a result of which the propellant 6 burns up very quickly, forming within minimum time a large amount of hot gas which flows through the filters 7 where it is cleaned of slags and dirt. The filters 7 are located by steps formed centrally in the upper housing part 22 and the nozzle plate 26. The igniter 2 which is pressed into place in the sleeve 5 is bolted to the upper housing part 22 together with the sleeve 5 and a spacer washer 24.

The generated hot gas is subsequently able to exit through the nozzle plate 26 press-mounted in the lower third of the lower housing part 23 and through the nozzle contour 10 centrally machined therein. In the pitot zone 20 upstream of the nozzle 10 in the nozzle plate 26 the generated hot gas chokes and produces a high static pressure directly upstream of the nozzle, this static pressure being sufficient to open the seal (not shown in FIG. 2) at the pressure-relief ports 12 of the coolant reservoir 11 and to pressurize the latter. The hot gas generated by combustion of the propellant then flows through the nozzle 10, it thereby being strongly accelerated to form a high dynamic, but low static pressure. Due to pressurization of the coolant reservoir 11 the easily burstable sleeve accommodated therein, filled with cooling fluid 13, bursts and the cooling fluid 13 is forced through the opening 14 at the end face of the coolant reservoir 11 into the atomization and mixing zone 18.

The mixture of hot gas and vapor thus formed flows into the collecting space 17 of the lower housing part 23 of the inflator and is able to exit through the exit ports 16 machined in the lower housing part of the inflator for inflating the air-bag located downstream. Sufficient space still exists directly upstream of the exit ports 16 for integrating additional filter units, if required.

The second embodiment of the present invention as described represents but one possibility of arranging the components cited. Just as feasible are further embodiments which contribute towards improving functioning of the inflator. Accordingly, it is, for example, feasible to amplify the pressure-relief ports 12 by one or more face end pressure-relief port(s) in the pressure plate 25 to also exploit the dynamic pressure of the hot gas generated by the combustion of the booster charge 3 to force the cooling fluid 13 out of the coolant reservoir 11 quicker.

The invention finds application preferably in passive motor vehicle occupant protection systems requiring an air-bag of an impact protection device to be inflated in a predetermined time. The invention can be put to use in impact protection systems on the driver's side or on the side of the front passenger as well as in side impact protection systems and in head, knee and thorax systems. Other fields of application are to be found in air/sea and mountain rescue means such as life jackets, life rafts, rescue air-bags for avalanche accidents, etc.

Also feasible are aerospace applications such as e.g. rapid inflation of a rescue balloon for sensitive and valuable payloads when uncoupled from the launch system (emergency explosion of the launch rocket and rescue of the payload by inflation of a rescue balloon).

What is claimed is:

1. An inflator, in particular for passive vehicle occupant restraint systems, comprising a housing (1, 15; 22, 23), a combustion chamber (21) formed in said housing and including solid propellant (6) for generating hot gas, and a coolant (13) introduced into a predetermined flow path of the hot gas, characterized in that the flow path of the hot gas passes through a nozzle (10) comprising a pitot zone (20) in which the hot gas emerging from said combustion chamber (21) has a high static pressure, and comprising a nozzle neck (19) in which the hot gas builds up a high dynamic pressure, and that said coolant (13) is arranged in a sleeve-shaped reservoir (11) extending from said pitot zone (20) at least in part into said nozzle neck (19).

2. The inflator as set forth in claim 1, characterized in that said reservoir (11) is provided in the region of said pitot zone (20) of said nozzle (10) with pressure-relief ports (12).

3. The inflator as set forth in claim 1, characterized in that said reservoir (11) is provided in the region of said nozzle neck (19) with one or more openings (14).

4. The inflator as set forth in claim 3, characterized in that said openings (14) are set back relative to the downstream end of said nozzle neck (19) and in the upper end of said nozzle neck (19) a mixing zone (18) for the hot gas and said coolant (13) is configured.

5. The inflator as set forth in any of the claim 1, characterized in that said housing (1, 5) is configured tubular and consists essentially of an upper housing part (1) and a lower housing part (15).

6. The inflator as set forth in claim 5, characterized in that said nozzle (10) is arranged in said upper housing part (1) and coaxially to said combustion chamber (21) formed in said lower housing part (15).

7. The inflator as set forth in claim 5, characterized in that the wall of said upper housing part (1) locates said nozzle (10) centered.

8. The inflator as set forth in claim 5, characterized in that said combustion chamber (21) is separated from said nozzle (10) by a perforated plate (8) having bore holes (9) for the exit of the hot gas towards said nozzle (10).

9. The inflator as set forth in claim 8, characterized in that said sleeve-shaped reservoir (11) for said coolant (13) is centrally secured to said perforated plate (8) and is arranged coaxially to said nozzle (10).

10. The inflator as set forth in claim 1, characterized in that said housing (22, 23) comprises a pot-shaped lower housing part (23) and a cover-like upper housing part (22).

11. The inflator as set forth in claim 10, characterized in that arranged in the middle of said upper housing part (22) are an igniter (2) and a sleeve (5) which in the region of said igniter (2) is filled with a pyrotechnical booster charge (3).

12. The inflator as set forth in claim 10, characterized in that said coolant (13) is located on the side of said sleeve (5) opposite said igniter (2) and is separated from said pyrotechnical booster charge (3) by a pressure plate (25).

13. The inflator as set forth in claim 1, characterized in that said combustion chamber (21) annularly surrounds said sleeve (5).

14. The inflator as set forth in claim 10, characterized in that said nozzle (10) is located press-mounted in the middle of a nozzle plate (26) pressed into place in said lower housing part (23), said nozzle (10) being located opposite said sleeve (5).

15. The inflator as set forth in claim 1, characterized in that said solid propellant (6) is present in the form of pellets, rings or compacts.

16. The inflator as set forth in claim 1, characterized in that said coolant (13) in said reservoir (11) is enclosed in a burstable sleeve.

* * * * *